(12) United States Patent
Fischer et al.

(10) Patent No.: US 12,703,317 B2
(45) Date of Patent: Aug. 11, 2026

(54) ROOF-MOUNTED OCCUPANT RESTRAINT SYSTEM

(71) Applicant: ZF Passive Safety Systems US Inc., Washington, MI (US)

(72) Inventors: Kurt F. Fischer, Rochester, MI (US); Angelo J. Adler, Shelby Township, MI (US); Alexandra E. Schroeder, Lenox, MI (US); Hylus Ranjit Raj Jayakar, Shelby Township, MI (US); Dylan P. Moran, Rochester Hills, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 18/190,275

(22) Filed: Mar. 27, 2023

(65) Prior Publication Data

US 2023/0234532 A1 Jul. 27, 2023

Related U.S. Application Data

(62) Division of application No. 16/971,318, filed as application No. PCT/US2019/020182 on Mar. 1, 2019, now Pat. No. 11,613,226.

(60) Provisional application No. 62/661,667, filed on Apr. 24, 2018, provisional application No. 62/636,899, filed on Mar. 1, 2018.

(51) Int. Cl.
*B60R 21/214* (2011.01)
*B60R 21/231* (2011.01)
(Continued)

(52) U.S. Cl.
CPC .......... *B60R 21/214* (2013.01); *B60R 21/231* (2013.01); *B60R 21/232* (2013.01);
(Continued)

(58) Field of Classification Search
CPC . B60R 21/214; B60R 21/233; B60R 21/2338; B60R 21/26; B60R 21/232;
(Continued)

(56) References Cited

U.S. PATENT DOCUMENTS 6,343,810 B1 2/2002 Breed
7,926,840 B1 * 4/2011 Choi .................... B60R 21/214 280/730.1
(Continued)

FOREIGN PATENT DOCUMENTS

DE 102009033022 A1 3/2011
JP 2014046906 A * 3/2014
(Continued)

*Primary Examiner* — Keith J Frisby
(74) *Attorney, Agent, or Firm* — Tarolli, Sundheim, Covell & Tummino LLP

(57) ABSTRACT

A restraint system for helping to protect an occupant of a vehicle having a roof and a cabin with a seat for the occupant includes an airbag mounted to the vehicle roof. The airbag has a stored condition and is inflatable to a deployed condition having a front-facing occupant receiving portion and an opposite rear-facing portion facing away from the occupant. The airbag has one or more connections with the vehicle roof, with the airbag and the connections being configured such that the roof serves as a reaction surface for supporting the airbag against movement in response to a forward moving occupant impacting the occupant receiving portion. The system is non-reliant on the rear-facing portion of the airbag engaging and using vehicle structure as a reaction surface for supporting the airbag against movement in response to the impacting occupant.

7 Claims, 15 Drawing Sheets

(51) Int. Cl.
*B60R 21/232* (2011.01)
*B60R 21/2338* (2011.01)

(52) U.S. Cl.
CPC .................... *B60R 21/2338* (2013.01); *B60R 2021/23153* (2013.01); *B60R 2021/23386* (2013.01)

(58) Field of Classification Search
CPC ................ B60R 21/231; B60R 21/213; B60R 2021/23192; B60R 2021/23153; B60R 2021/23324; B60R 2021/23386; B60R 2021/23161; B60R 2021/0004; B60R 2021/23308; B60R 2021/23316; B60R 2021/23332; B60R 2021/0048; B60R 2021/26058
USPC .................................. 280/729, 730.1, 743.2
See application file for complete search history.

(56) References Cited

U.S. PATENT DOCUMENTS 8,579,321 B2 11/2013 Lee et al.
9,533,650 B2 1/2017 Le Norcy et al.
9,676,361 B2 6/2017 Smith et al.
9,744,932 B1 8/2017 Faruque et al.
10,358,108 B2 * 7/2019 Jung .................. B60R 21/2334
2005/0073135 A1 4/2005 Choi
2008/0243342 A1 10/2008 Breed
2010/0133797 A1 * 6/2010 Kim ..................... B60R 21/214 280/743.2
2012/0049491 A1 * 3/2012 Yoo ...................... B60R 21/233 280/729
2012/0049492 A1 3/2012 Choi
2012/0133114 A1 5/2012 Choi et al.
2012/0242070 A1 9/2012 Paxton et al.
2017/0113646 A1 4/2017 Lee et al.
2017/0129442 A1 * 5/2017 Choi .................... B60R 21/232
2017/0225570 A1 8/2017 El Aile et al.
2017/0225641 A1 8/2017 Faruque et al.
2019/0161048 A1 * 5/2019 Thomas ............... B60R 21/264
2019/0217804 A1 7/2019 Cho

FOREIGN PATENT DOCUMENTS

JP 2016030545 A * 3/2016
JP 2018008661 A * 1/2018
WO WO-2008095615 A1 * 8/2008 .......... B60R 21/214

* cited by examiner

ROOF-MOUNTED OCCUPANT RESTRAINT SYSTEM

RELATED APPLICATIONS

This application is a divisional of U.S. application Ser. No. 16/971,318, filed on Aug. 20, 2020, which issued as U.S. Pat. No. 11,613,226 on Mar. 28, 2023. U.S. application Ser. No. 16/971,318 is National Stage of International Serial No. PCT/US2019/020182 filed on Mar. 1, 2019, which claims the benefit of U.S. Provisional Appln. Nos. 62/661,667, filed Apr. 24, 2018; and 62/636,899, filed Mar. 1, 2018, the entirety of which are incorporated by reference herein.

TECHNICAL FIELD

The present invention relates generally to vehicle airbags and, in particular, relates to roof-mounted airbags that rely on the roof for a reaction surface.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle-front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free to utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surfaces.

SUMMARY

According to one aspect, a restraint system for helping to protect an occupant of a vehicle having a roof and a cabin with a seat for the occupant includes an airbag mounted to the vehicle roof. The airbag has a stored condition and is inflatable to a deployed condition. The airbag, when deployed, having a front-facing occupant receiving portion and an opposite rear-facing portion facing away from the occupant. The airbag has one or more connections with the vehicle roof, with the airbag and the connections being configured such that the roof serves as a reaction surface for supporting the airbag against movement in response to a forward moving occupant impacting the occupant receiving portion. The system is non-reliant on the rear-facing portion of the airbag engaging and using vehicle structure as a reaction surface for supporting the airbag against movement in response to a forward moving occupant impacting the occupant receiving portion.

According to another aspect, a restraint system for helping to protect an occupant of a vehicle having a roof and a cabin with a seat for the occupant includes an airbag mounted to the vehicle roof. The airbag has a stored condition and is inflatable to a deployed condition. The airbag when deployed has a first end connected to the roof, a second end, and a middle portion between the first and second ends. The airbag is connected to the roof such that the roof serves as a reaction surface for supporting the airbag against movement in response to a forward moving occupant penetrating the airbag with the middle portion being free from engagement with vehicle structure in response to occupant penetration.

According to another aspect, taken alone or in combination with any other aspect, at least one tether has a first end connected to the airbag and a second end connected to the vehicle roof. The at least one tether is configured to transmit the energy of an occupant penetrating the airbag to the vehicle roof.

According to another aspect, taken alone or in combination with any other aspect, the airbag is configured to be positioned in front of the vehicle occupant and the second end of the tether is configured to be connected to the vehicle roof behind the vehicle occupant.

According to another aspect, taken alone or in combination with any other aspect, the airbag is configured to pivot about its connection to the vehicle roof in response to being acted upon by an impacting occupant. An upper portion of the airbag is configured to engage the vehicle roof to cause the vehicle roof to act as the reaction surface for restraining the movement of the airbag in response to occupant penetration.

According to another aspect, taken alone or in combination with any other aspect, at least one tether has a first end connected to the airbag and a second end connected to the vehicle roof at the location where the airbag is mounted. The at least one tether is configured to transmit the energy of an occupant penetrating the airbag to the vehicle roof.

According to another aspect, taken alone or in combination with any other aspect, the second end of the tether is configured to be connected to an airbag module in which the airbag resides in the stored condition.

According to another aspect, taken alone or in combination with any other aspect, the airbag and tether are configured so that the tether limits the distance that a lower portion of the airbag can move away from the vehicle roof, which induces a bend in the receiving portion of the airbag presented concavely in the path along which the occupant travels into contact with the airbag.

According to another aspect, taken alone or in combination with any other aspect, the fabric of the receiving portion into which the occupant travels into contact has a reduced surface tension due to the bend.

According to another aspect, taken alone or in combination with any other aspect, the airbag comprises at least one internal tether for shaping the receiving portion.

According to another aspect, taken alone or in combination with any other aspect, the at least one internal tether helps reduce the surface tension on the fabric of the receiving portion.

According to another aspect, taken alone or in combination with any other aspect, the at least one internal tether helps create a pocket for receiving the occupant.

According to another aspect, taken alone or in combination with any other aspect, the airbag has a generally U-shaped configuration with spaced legs. The airbag is configured to pivot about its connection to the vehicle roof in response to occupant penetration. An upper portion of at least one of the legs is configured to engage the vehicle roof to cause the vehicle roof to act as the reaction surface for restraining movement of the airbag in response to occupant penetration.

According to another aspect, taken alone or in combination with any other aspect, the legs are interconnected by a tether. Inflation of the airbag urges the legs to move away from each other with the movement being limited by the tether. The urging of the legs away from each other pre-loads the legs against deflection in response to the airbag engaging the roof.

According to another aspect, taken alone or in combination with any other aspect, the airbag constitutes a curtain airbag that spans across the cabin. The restraint system further includes at least one tether having a first end connected to the curtain airbag and a second end connected to the vehicle. The at least one tether is configured to transmit the energy of an occupant penetration to the vehicle.

According to another aspect, taken alone or in combination with any other aspect, the tether is connected to at least one of the vehicle roof and a side structure of the vehicle.

According to another aspect, taken alone or in combination with any other aspect, the airbag constitutes a plurality of horizontal chambers extending laterally in the vehicle. The restraint system further includes a shaping sheet that supports the chambers and tethers that connect the shaping sheets to the vehicle. The shaping sheets are configured to arrange the chambers in a curved configuration when viewed in profile.

According to another aspect, taken alone or in combination with any other aspect, the chambers are arranged convexly toward the occupant.

According to another aspect, taken alone or in combination with any other aspect, the chambers are arranged concavely toward the occupant.

According to another aspect, taken alone or in combination with any other aspect, the restraint system is configured to use only the roof as the reaction surface.

According to another aspect, taken alone or in combination with any other aspect, the airbag includes a first portion extending along the vehicle roof and a second, U-shaped portion extending towards the occupant and having a first leg extending from the first portion and a second leg connected to the first leg. The second leg moves into engagement with the first leg in response to occupant penetration.

According to another aspect, taken alone or in combination with any other aspect, at least one tether is connected to the first leg and the roof for limiting movement of the first leg in response to the second leg engaging the first leg.

According to another aspect, taken alone or in combination with any other aspect, a sensor senses the occurrence of an event for which deployment of the airbag is desired and produces a signal indicative thereof. A controller is connected to the sensor and, in response to receiving the signal, actuates an inflator to inflate the airbag to the deployed condition.

Other objects and advantages and a fuller understanding of the invention will be had from the following detailed description and the accompanying drawings.

DETAILED DESCRIPTION

Figure 1:
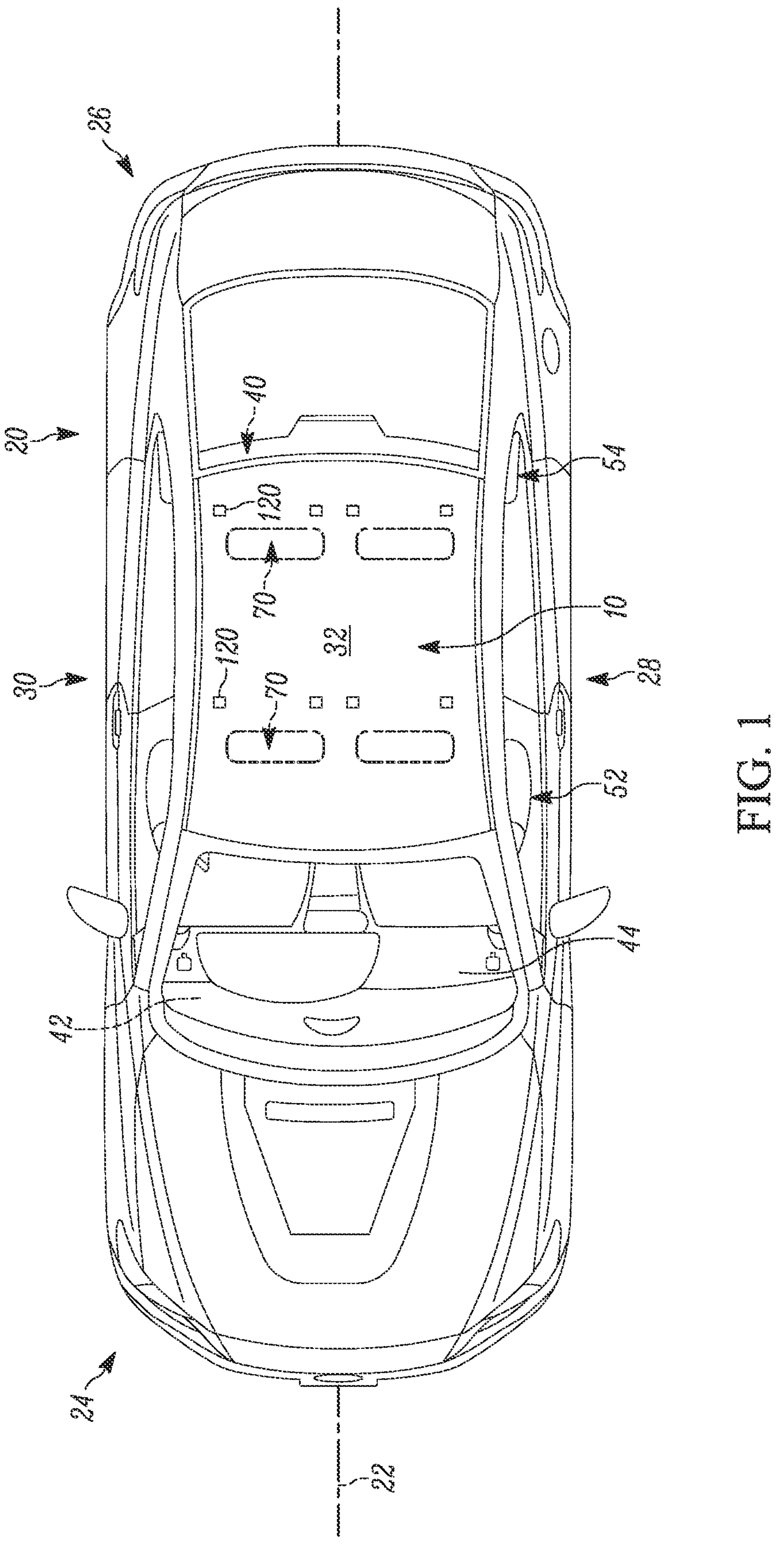
FIG. 1 is a top view of a vehicle including an example roof-mounted, occupant restraint system.
Figure 2:
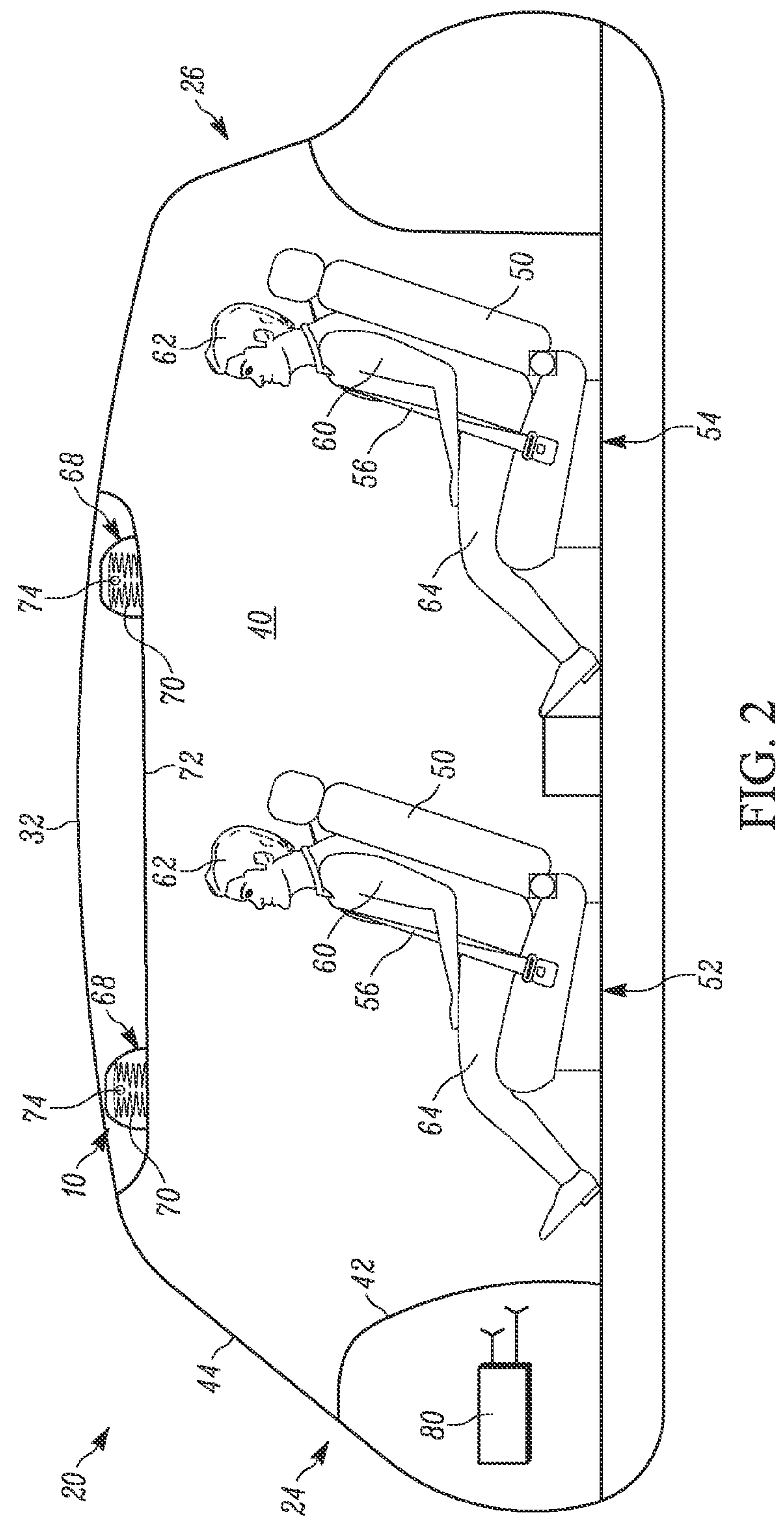
FIG. 2 is a schematic illustration of a cabin of the vehicle with a first seating arrangement and an example airbag of the restraint system in a stored condition.

The present invention relates generally to vehicle airbags and, in particular, relates to roof-mounted airbags that rely on the roof for a reaction surface. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22. The first end 24 of the vehicle 20 includes an instrument panel 42 facing a passenger compartment or cabin 40. A windshield or windscreen 44 can be located between the instrument panel 42 and the roof 32.

The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40.

Seats 50 are positioned in the cabin 40. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, arranged in a forward-facing manner similar to that of conventional automobiles. It will be appreciated that the vehicle 20 could alternatively include more or fewer rows of seats 50 (not shown). Regardless, each seat 50 is fitted with a seatbelt 56 for restraining its occupant 60.

For the conventional, forward-facing seating arrangement of FIG. 2, in the event of a frontal crash, the occupants 60 of both the front and rear rows 52, 54 are restrained by their respective seatbelts 56. Additional restraints are, however, desirable for head and neck support. This additional protection is typically provided, at least for the front row 52 occupants, by instrument panel mounted airbags. In the autonomous vehicle 20 of FIG. 2, however, the instrument panel can be reduced in size and/or removed altogether. Control interfaces for climate controls, GPS, navigation, entertainment, etc. can, for example, be provided in a center console area of the vehicle 20 located between the occupants 60 of the front and/or rear rows 52, 54.

That said, since the front row 52 need not be in close proximity to the instrument panel 42 or the area where an instrument panel would normally reside, there can be a large volume of space between the front row 52 and the forward cabin structure presented facing the front row. Because of this, it may not be efficient to deploy airbags from this location due to the large volume that the airbags would need to occupy. This would present problems in sizing the airbag(s) and inflator(s) to occupy that large volume and could also present problems in deploying the airbag(s) into that large volume in the necessary short time required to protect the occupants in a crash scenario.

It is therefore evident that the various passenger seating configurations enabled by autonomous vehicles can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface, such as an instrument panel, presents additional challenges.

With this in mind, the occupant safety system 10 shown in FIGS. 1-2 includes at least one vehicle occupant protection device in the form of an inflatable airbag 70 mounted in the roof 32 of the vehicle 20. Mounting the airbags 70 in the vehicle roof 32 is convenient because the airbags can be positioned in a location with a desired proximity to the occupant(s) 60 they are intended to help protect. This can help reduce the necessary inflatable volume of the airbags 70 and can also help provide a desired airbag deployment time without requiring an excessively high-volume inflator.

The airbags 70 are housed/concealed in the roof structure of the vehicle 20 behind, for example, a roof liner 72. The airbag 70 is at least one of rolled and folded before being placed behind the roof liner 72. The rolled airbag 70 can be provided in a cover or housing/module 68 that is then placed behind the roof liner 72. The occupant restraint system 10 also includes an inflator 74 positioned in each module 68 for providing inflation fluid to each airbag 70. The inflators 74 are operatively connected (e.g., by wires) to an airbag controller 80 (see FIG. 2) that includes or communicates with one or more crash sensors (not shown). The airbag controller 80 is operative to determine the occurrence of a crash event and to actuate the inflators 74 in a known manner to inflate the airbags 70. The inflators 74 can be of any known type, such as stored gas, solid propellant, augmented or hybrid.

The airbag 70 can be constructed of any suitable material, such as nylon (e.g., woven nylon 6-6 yarns), and may be constructed in any suitable manner. For example, the airbag 70 may include one or more pieces or panels of material. If more than one piece or panel is used, the pieces or panels can be interconnected by known means, such as stitching, ultrasonic welding, heat bonding, or adhesives, to form the airbag 70. The airbag 70 can be uncoated, coated with a material, such as a gas impermeable urethane, or laminated with a material, such as a gas impermeable film. The airbag 70 can therefore have a gas-tight or substantially gas-tight construction. Those skilled in the art will appreciate that alternative materials, such as polyester yarn, and alternatives coatings, such as silicone, may also be used to construct the airbag 70.

The occupant restraint system 10 can include multiple airbags 70 provided along the roof 32 and within the roof liner 72 at locations associated and aligned with each seat 50 in each row 52, 54. In other words, each seat 50 in the vehicle 20 can have an individual module 68 (with corresponding airbag 70 and inflator 74) associated and aligned therewith. In each case, the airbag 70 is positioned in front of the associated seat 50 in each row 52, 54 in the direction the occupants 60 in those seats would face (i.e., forward of the front row 52 and forward of the rear row 54).

The airbags 70 extend in the left-to-right direction of the vehicle 20 and generally parallel to the width of the seats 50. In the example shown in FIG. 2, airbags 70 are provided behind the roof liner 72 and are each associated with a single seat 50 in each row 52, 54. Alternatively, a single airbag 70 can span the entire width of the cabin 40 to protect all the occupants 60 in an entire row 52 or 54 (not shown). Although the airbags within each example construction described herein are identical for each row provided in the vehicle 20, the construction and operation of only the airbag associated with a seat 50 in the rear row 54 is discussed for brevity.

Figure 3A:
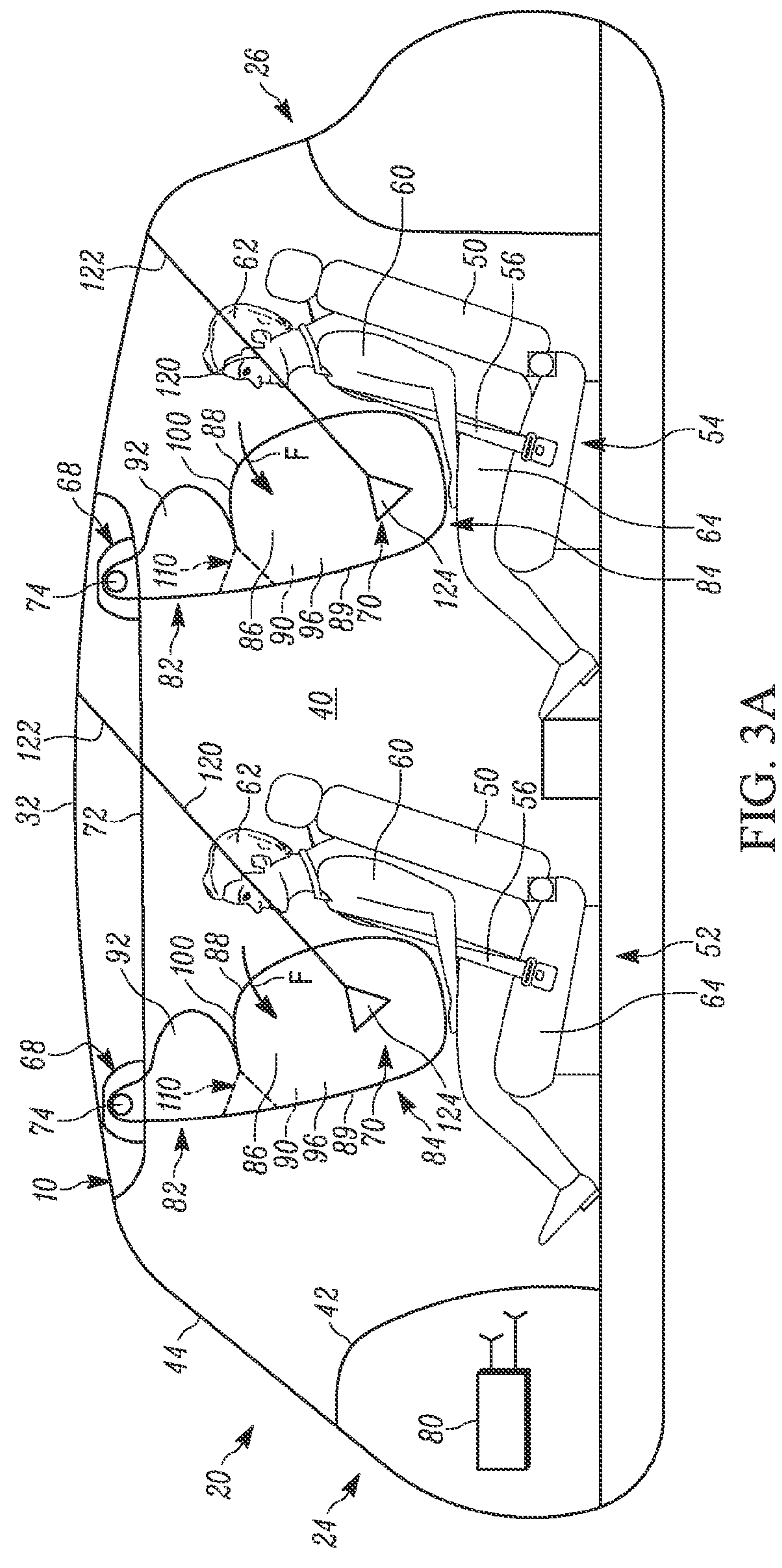
FIG. 3A is a schematic illustration of the cabin of the vehicle with the airbag in a deployed condition.

As shown in FIG. 3A, upon sensing the occurrence of an event for which inflation of the airbag 70 is desired, such as a vehicle collision, the controller 80 provides signals to the inflator 74. Upon receiving the signals from the controller 80, the inflator 74 is actuated and provides inflation fluid to the inflatable volume of the airbag 70 in a known manner. The inflating airbag 70 exerts a force on the roof liner 72, which causes the roof liner to open (e.g., via tear seam or door). This releases the airbag 70 to inflate and deploy from a stored condition behind the roof liner 72 to a deployed condition extending into the cabin 40 forward of and aligned with the seat 50 in the rear row 54. The airbag 70, while inflated, helps protect the vehicle occupant 60 in the rear row 54 by absorbing the impact of the occupant.

The airbag 70, when deployed, extends from an upper end 82 to a lower end 84 and defines an inflatable volume 90. A middle portion 86 is provided between the upper and lower ends 82, 94. The upper end 82 is connected to the vehicle 20 and fluidly connected to the inflator 74. The lower end 84 is positioned adjacent an occupant 60 in the rear row 54. A front-facing receiving surface or portion 88 is presented towards the occupant 60. An opposing, rear-facing surface or portion 89 faces away from the occupant 60.

Figure 3B:
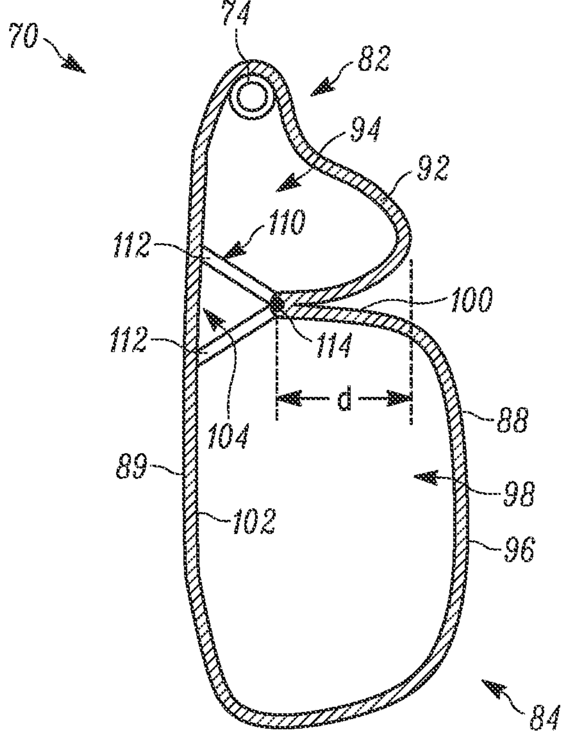
FIG. 3B is an enlarged sectional view of a portion of the airbag of FIG. 3A.

The airbag 70 includes an upper portion 92 defining an upper inflatable chamber 94 (FIG. 3B). A lower portion 96 of the airbag 70 defines a lower inflatable chamber 98 (see FIG. 3B). A folded portion 100 extends a depth d into the inflatable volume 90 towards an inner wall 102 of the airbag 70. The folded portion 100 separates the upper and lower inflatable chambers 94, 98 and is formed as an inverted portion of the airbag 70 material. The folded portion 100 forms a restriction 104 or reduced cross-sectional area of the airbag 70 between the chambers 94, 98 and acts as an indentation for reducing loads of the airbag.

A tether 110 connects the folded portion 100 to the inner wall 102 to maintain the folded portion 100 in the inverted condition. To this end, the tether 110 extends between a pair of ends 112 and includes a portion 114 between the ends secured to the inverted folded portion 100. The tether 110 is formed from a single piece of inextensible material. Alternatively, the tether 110 can be formed as two pieces, each including one of the ends 112 and secured to the folded portion 100. In any case, the folded portion 100 formed by the tether 110 can improve occupant 60 protection by providing an enhanced degree of cushioning for the occupant's upper torso and/or head 62.

As noted, there is no vehicle structure in position to act as a reaction surface to constrain movement of the deployed airbag 70. That said, roof tethers 120 (FIG. 3A) can support the airbag 70 against movement in response to occupant 60 penetration. More specifically, the roof tethers 120 replace the reaction surface typically required for frontal passenger airbags. To this end, a pair of roof tethers 120 can be provided for the airbag 70 on the inboard and outboard sides thereof on opposite sides of the occupant 60. Each roof tether 120 extends from a first end 122 connected to the roof 32 to a second end 124 connected to the lower end 84 of the airbag 70. The first ends 122 of the roof tethers 120 connect to the vehicle 20 rearward of the airbag 70, occupant 60, and vehicle seat 50. The second end 124 can constitute or include a stress reducer for spreading the connection between the tethers 120 and the airbags 70 over a large surface of the airbag fabric so as to prevent tearing.

Because the occupant 60 is belted, a frontal crash resulting in forward occupant movement causes the occupant to bend at the waist and follow an angled or arcuate path toward the receiving portion 88 of the airbag 70, as indicated generally by the arrow F in FIG. 3A. Once the moving occupant 60 engages the inflated lower portion 96, the airbag 70 is urged to move in the direction F. The roof tethers 120, being connected to the roof 32 and the lower end 84, prevent the airbag 70 from moving in the direction F.

Advantageously, as shown in FIG. 3A, the location of the first end 122/roof 32 connections can be selected such that the roof tethers 120 extend in a direction or along a path that approximates or coincides with (i.e., lies substantially parallel to or coextensive with) the path along which the occupant 60 travels into contact with the airbag 70. In this manner, the tension the roof tethers 120 apply to the airbag 70 can be opposite the impact forces applied to the airbag by the penetrating occupant 60. As a result, the roof 32, through the roof tethers 120, acts as the reaction surface for the airbag 70. The airbag 70 therefore provides a ride-down effect on the moving occupant 60 to thereby help reduce loads thereon. To this end, the airbag 70 accommodates the moving occupant 60 by providing a more gradual reaction force in response to occupant penetration. Consequently, the example configuration of FIGS. 3A-3B requires no interaction with forward structure of the vehicle 20, such as an instrument panel, steering wheel, or seat, to provide a reaction surface for the airbag 70.

Figure 4:
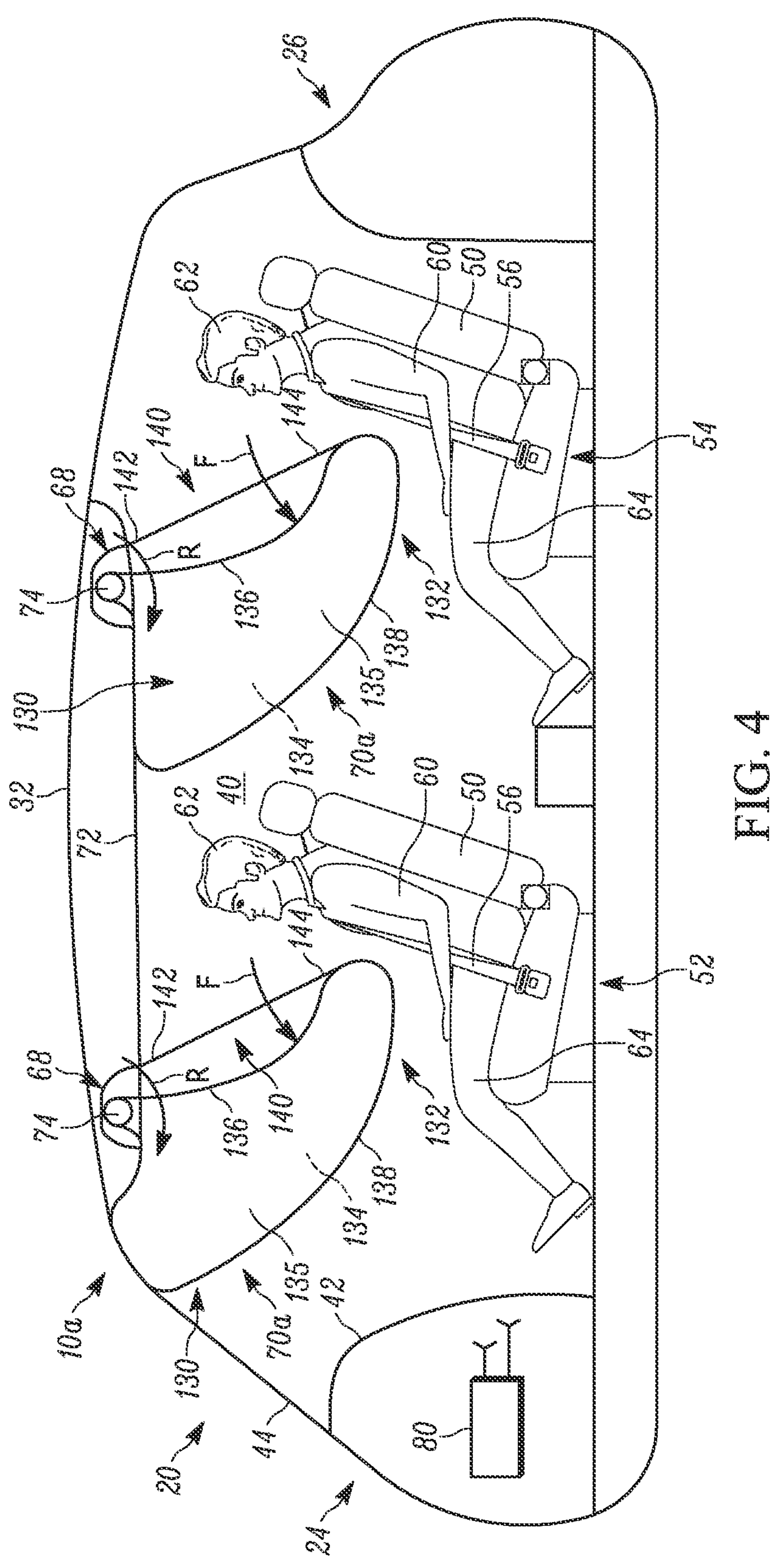
FIG. 4 is a schematic illustration of another example airbag in a deployed condition.

FIG. 4 illustrates another example configuration of the occupant restraint system 10*a*. In FIG. 4, the airbag module 68 includes an airbag 70*a* and tethers 140 self-contained within the air bag module. The tethers 140 are self-contained in that they are integral to the airbag module 68 and can therefore be installed in the vehicle 20 simply through installation of the modules in the roof 32.

The airbag 70*a*, when deployed, extends from an upper end 130 to a lower end 132 and defines an inflatable volume 134. A middle portion 135 is provided between the upper and lower ends 132, 134. The upper end 130 is connected to the vehicle 20 and fluidly connected to the inflator 74. The lower end 132 is positioned adjacent an occupant 60 in the rear row 54. The airbag 70*a* also includes a front-facing receiving surface or portion 136 presented towards the occupant 60. An opposite, rear-facing portion or surface 138 faces away from the occupant 60.

The self-contained tethers 140 support the airbag 70*a* against movement in response to occupant 60 penetration. The self-contained tethers 140 extend from first ends 142 connected to structure of the airbag module 68, such as the housing. The first ends 142 are therefore indirectly connected to the roof 32. The second ends 144 of the tethers 140 are connected to the lower end 132 of the airbag 70*a*. As shown, the second ends 144 are connected to portions of the lower end 132 facing the occupant 60 (i.e., the tethers 140 are positioned substantially entirely between the occupant 60 and the airbag 70*a*).

The tethers 140 limit the distance the lower end 132 of the airbag 70*a* can move away from the vehicle roof 32. As a result, as the airbag 70*a* deploys, the tethers 140 induce an upward/rearward curve or bend in the lower end 132 of the airbag. Advantageously, as shown in FIG. 4, the tethers 140 can be configured such that the curvature of the lower end 132 is presented in the path along which the occupant 60 travels into contact with the airbag 70*a*. In other words, the occupant-facing surface 136 can have a concave shape in response to the tethers 140 restricting deployment of the airbag 70*a*.

Furthermore, the deformation of the lower end 132 of the airbag 70*a* induced by the tethers 140 can cause the fabric of the occupant-facing surface 136 of the airbag to have a lower surface tension. In this manner, the occupant-facing surface 136 provides a softer surface for the impacting occupant 60 and will tend to envelop and cradle the occupant during ride-down in the forward/downward direction F. The tension that the self-contained tethers 140 apply to the airbag 70*a* can at least partially or substantially oppose the impact forces applied to the airbag by the penetrating occupant 60 and thereby provide the desired ride-down characteristics. In this manner, the roof 32, through the tethers 140, acts as the reaction surface for the airbag 70*a*.

Additionally, the occupant 60 impacting the airbag 70*a* can cause the entire airbag to pivot about its connection to the roof 32 at the airbag module 68 in the manner R. When this occurs, the upper end 130 of the airbag 70*a* engages the roof 32 and further acts as a reaction surface for the airbag 70*a* by preventing additional rotation in the manner R. For these reasons, the example airbag 70*a* configuration of FIG. 4 requires no interaction with forward structure of the vehicle, such as an instrument panel, steering wheel, or seat, to provide a reaction surface for the airbag.

Figure 5:
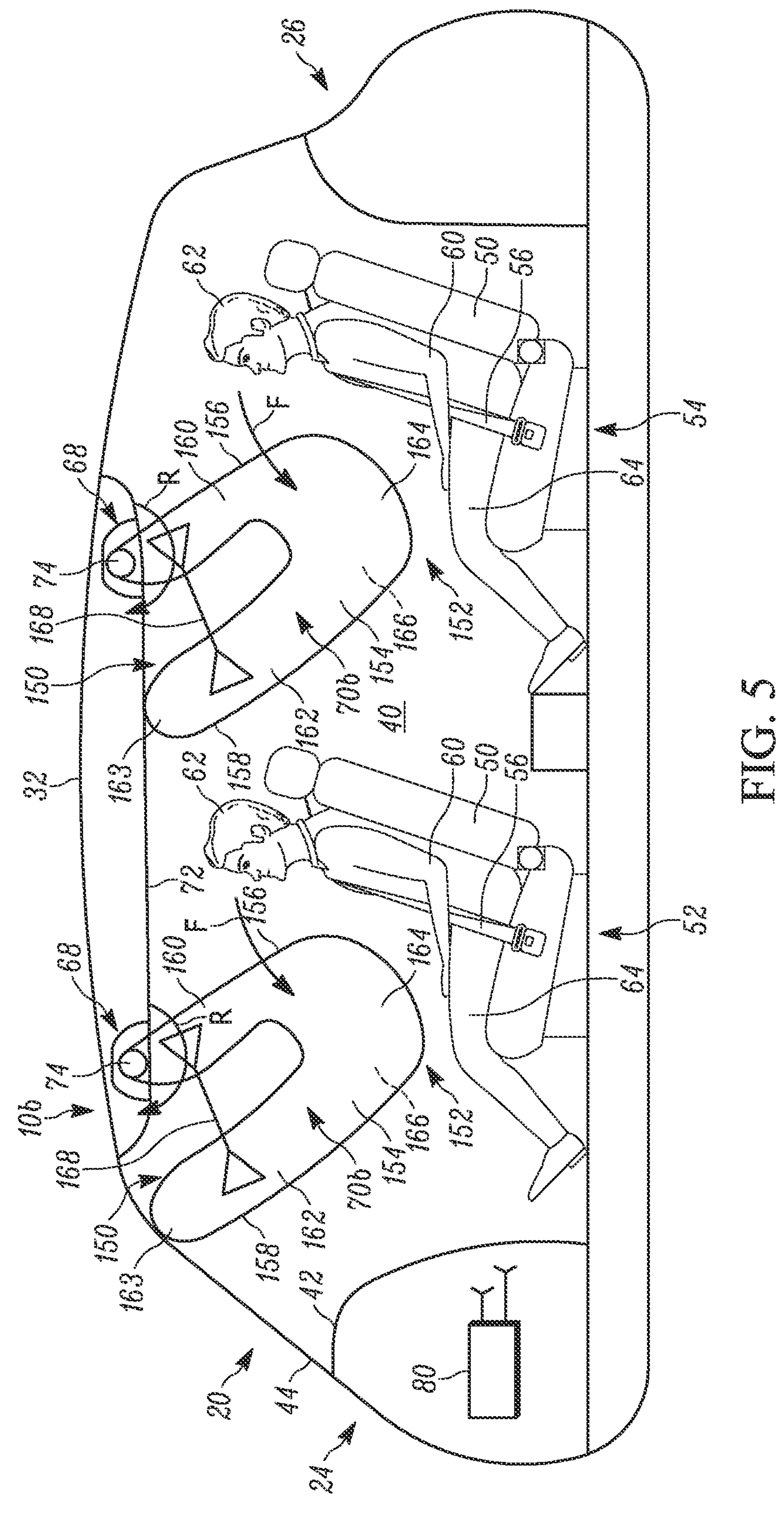
FIG. 5 is a schematic illustration of another example airbag in a deployed condition.

FIG. 5 illustrates another example configuration of the occupant restraint system 10*b*. In FIG. 5, the air bag module 68 includes an airbag 70*b* and self-contained tethers 168. The airbag 70*b*, when deployed, has a generally U-shaped configuration and extends from an upper end 150 to a lower end 152 and defines an inflatable volume 166. A middle portion 154 is provided between the upper and lower ends 150, 152. A front-facing receiving surface or portion 156 faces toward the occupant 60. An opposing rear-facing surface or portion 158 faces away from the occupant 60.

The airbag 70*b* includes a pair of spaced-apart legs 160, 162 connected by a lower portion 164. The leg 160 is connected to the airbag module 68 and receives inflation fluid from the inflator 74. The leg 162 forms a free end of the airbag 70*b*. The legs 160, 162 terminate adjacent the roof 32. The lower portion 164 is positioned closer to the occupant 60.

The U-shaped airbag 70*b* has a smaller inflatable volume 166 than a single chamber construction having the same outer, peripheral footprint while using more airbag fabric to define the inflatable volume. Since the legs 160, 162 of the U-shaped airbag 70*b* have comparatively small thicknesses, they have a high surface area to volume ratio. This renders the legs 160, 162 relatively and comparatively stiff when inflated.

The tethers 168 connect the legs 160, 162 to one another at the upper end 150 of the airbag 70*b*. In one example, the tethers 168 are provided on the inboard and outboard sides of the airbag 70*b*.

The construction of the airbag 70*b* is such that, during inflation, the legs 160, 162 tend to move away from each other (i.e., in the forward/rearward directions of the vehicle 20). The tethers 168 are configured to arrest this movement, becoming tensioned by the opposing forces applied by the legs 160, 162. In other words, the legs 160, 162 are inhibited from moving away from each other by the tethers 168 and especially resistant to movement toward each other because of the pressurized inflation fluid therein. This pre-loads the legs 160, 162 against movement toward each other.

Due to this construction, an upper portion 163 of the leg 162, in response to occupant 60 penetration into the receiving portion 156 of the airbag 70*b*, is configured to engage vehicle structure, such as the roof 32 and/or an upper portion of the windshield 44 adjacent the roof (when the airbag is associated with the front row 52 of seats 50). In this manner, the roof 32, through the tethers 168 and the upper portion 163 of the airbag 70*b*, acts as the reaction surface for the airbag. As a result, the engagement of the upper portion 163 against the reaction surface (i.e., the roof 32 and/or windshield 44), in combination with the pre-loaded legs 160, 162, produces a corresponding resistance to further pivotal bag movement in the manner R in response to the penetrating occupant 60.

For these reasons, the airbag 70*b* can at least partially or substantially oppose the impact forces applied thereto by the penetrating occupant 60 and thereby provide the desired ride-down characteristics. The example configuration of the airbag 70*b* of FIG. 5 therefore requires no interaction with forward structure of the vehicle, such as an instrument panel, steering wheel, or seat, to provide a reaction surface for the airbag.

Figure 6A:
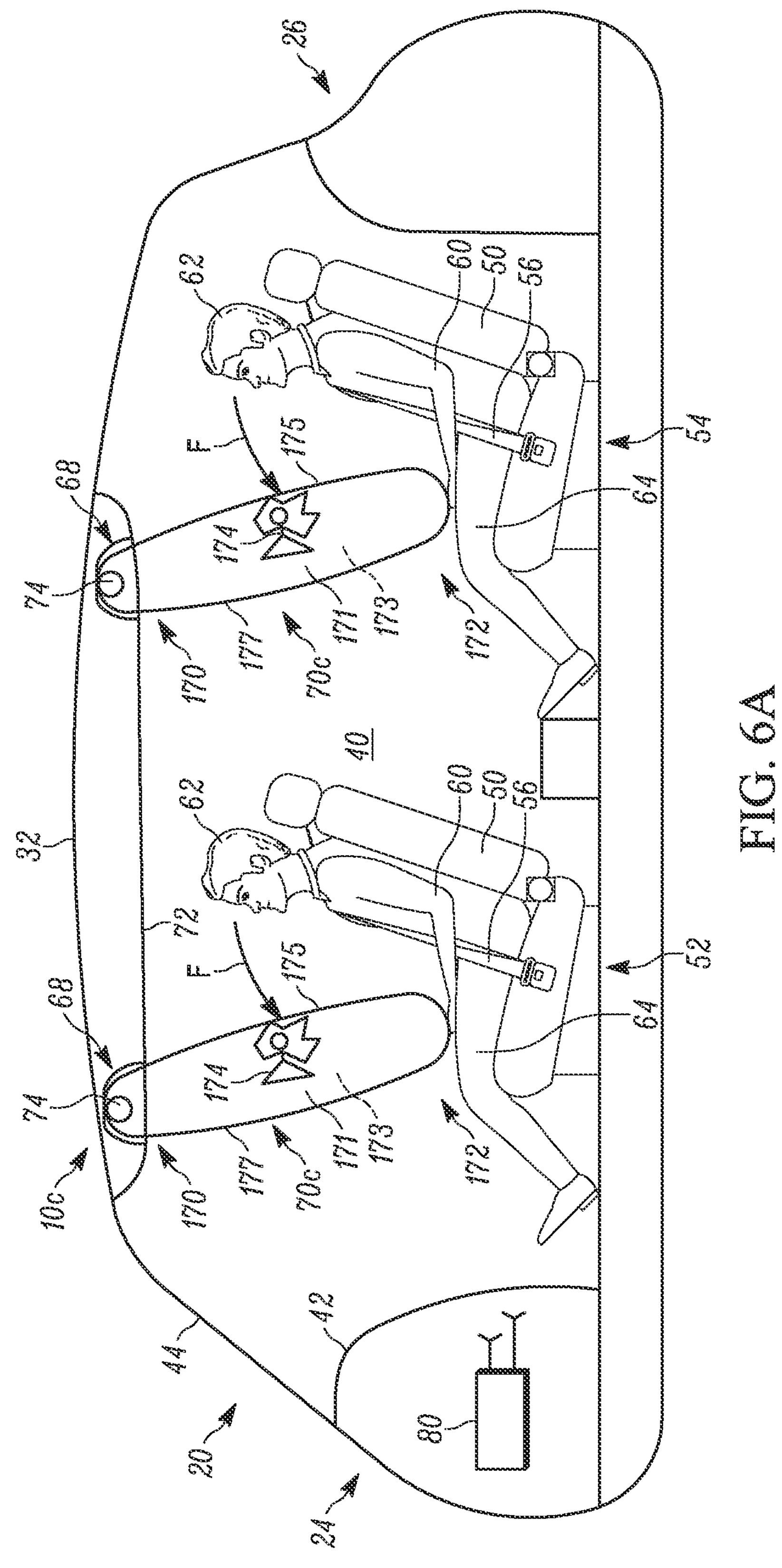
FIG. 6A is a schematic illustration of another example airbag in a deployed condition.
Figure 6B:
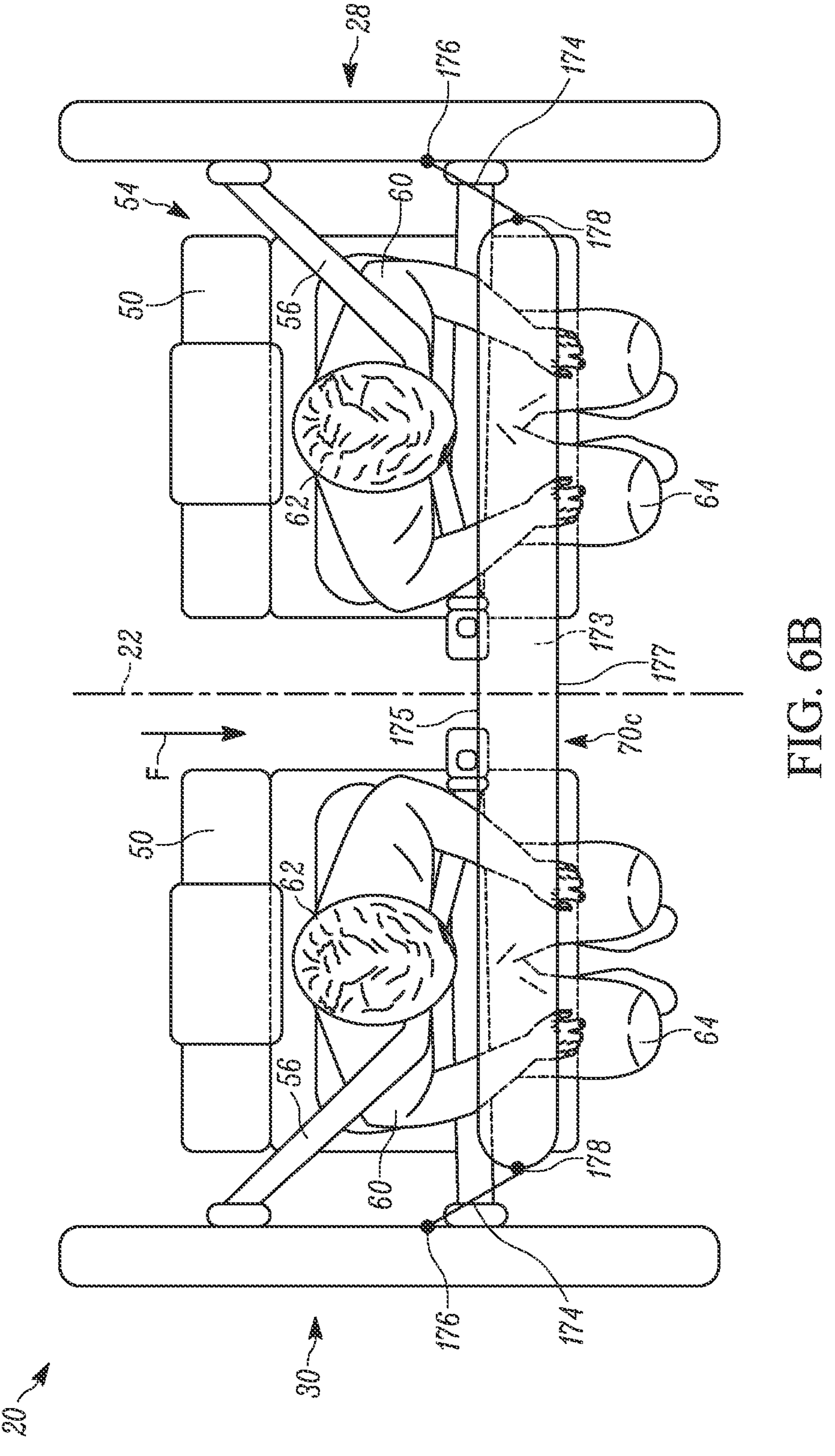
FIG. 6B is a top view of the deployed airbag of FIG. 6A.

FIG. 6A-6B illustrate another example configuration of the occupant restraint system 10*c*. In this configuration, the air bag module 68 includes an airbag 70*c* and tethers 174. The airbag 70*c*, when deployed, has a generally elongated, rectangular configuration and extends from an upper end 170 to a lower end 172 and defines an inflatable volume 173. The upper end 170 is connected to the airbag module 68 and receives inflation fluid from the inflator 74. The lower end 172 is positioned closer to the occupant 60. A middle portion 171 is provided between the upper and lower ends 170, 172. A front-facing receiving surface or portion 175 faces toward the occupant 60. An opposing rear-facing surface or portion 177 faces away from the occupant 60.

The airbag 70*c* is a curtain airbag having a thickness measured in the direction of vehicle 20 travel that is small in comparison to conventional frontal airbags. The airbag 70*c* can have constructions similar to side impact curtain airbags that deploy along a side structure of the vehicle in the event of a side impact and/or vehicle rollover. The curtain airbag 70*c* spans laterally across the width of the vehicle 20 (i.e., in the inboard-outboard direction) and thereby helps protect all the occupants 60 in the rear row 54 of seats 50.

The tethers 174 connect opposite lateral ends of the airbag 70*c* to structure on the left and right sides 28, 30 of the vehicle 20 (FIG. 6B). In one example, the tethers 174 can connect the airbag 70*c* to a vehicle side wall, door, or pillar, such as the B-pillar, C-pillar, D-pillar, etc. To this end, each tether 174 includes a first end 176 connected to one of the sides 28, 30 of the vehicle 20 and a second end 178 connected to one of the lateral sides of the airbag 70*c*. The second ends 178 can constitute or include stress reducers for spreading the connection between the tethers 174 and the airbag 70*c* over a large surface of the airbag fabric so as to prevent tearing. In any case, the tethers 174 can help maintain the airbag 70*c* at a desired position or altitude in the vehicle 20. For instance, the tethers 174 can position the airbag 70*c* to be angled slightly rearward in the vehicle 20, as shown in FIG. 6A.

The first end 176/vehicle 20 connections can be positioned laterally and/or rearward of the occupant facing surfaces of the airbag 70*c*. A rearward connection location can be used, for example, where the structure available for anchoring the first ends 176 of the tether 174 is positioned rearward of the airbag 70*c*, such as a vehicle pillar.

Advantageously, as shown in FIG. 6A, the tethers 174 can position the airbag 70*c* to lie normal to the path along which the occupants 60 travel into contact with the airbag. This places the receiving portion 175 of the airbag 70*c* in a position ideal for receiving the occupants 60. At the same time, the tethers 174 can support the airbag 70*c* against the impact forces applied to the airbag by the penetrating occupants 60. As a result, the roof 32, through the tethers 174 and side structure of the vehicle 20, acts as the reaction surface for the airbag 70*c*. The airbag 70*c* configuration of FIGS. 6A-6B therefore requires no interaction with forward structure of the vehicle 20, such as an instrument panel, steering wheel, or seat, to provide a reaction surface for the airbag.

Figure 7:
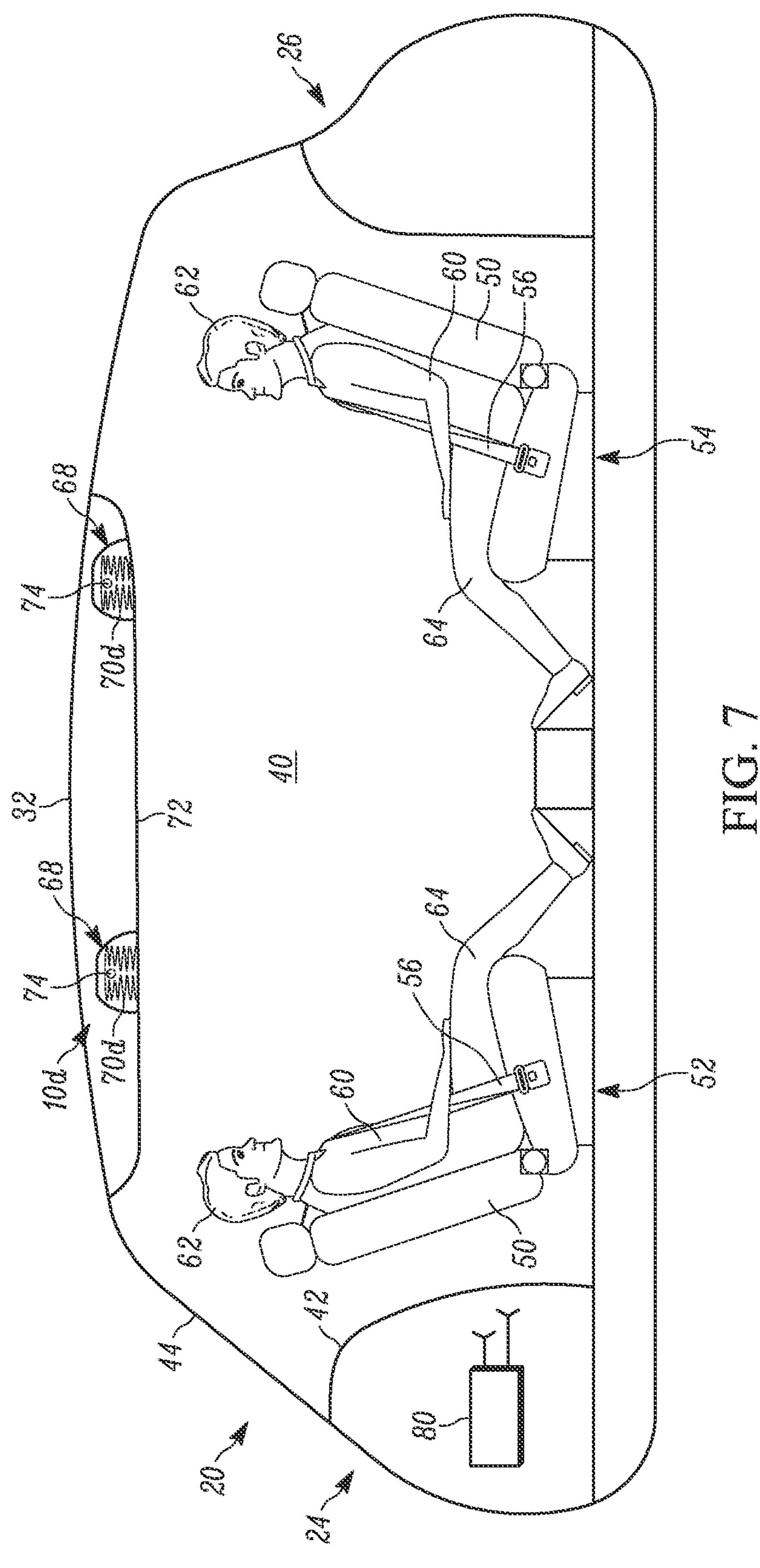
FIG. 7 is a schematic illustration of a cabin of the vehicle with a second seating arrangement and another example airbag of the restraint system in a stored condition.
Figure 8:
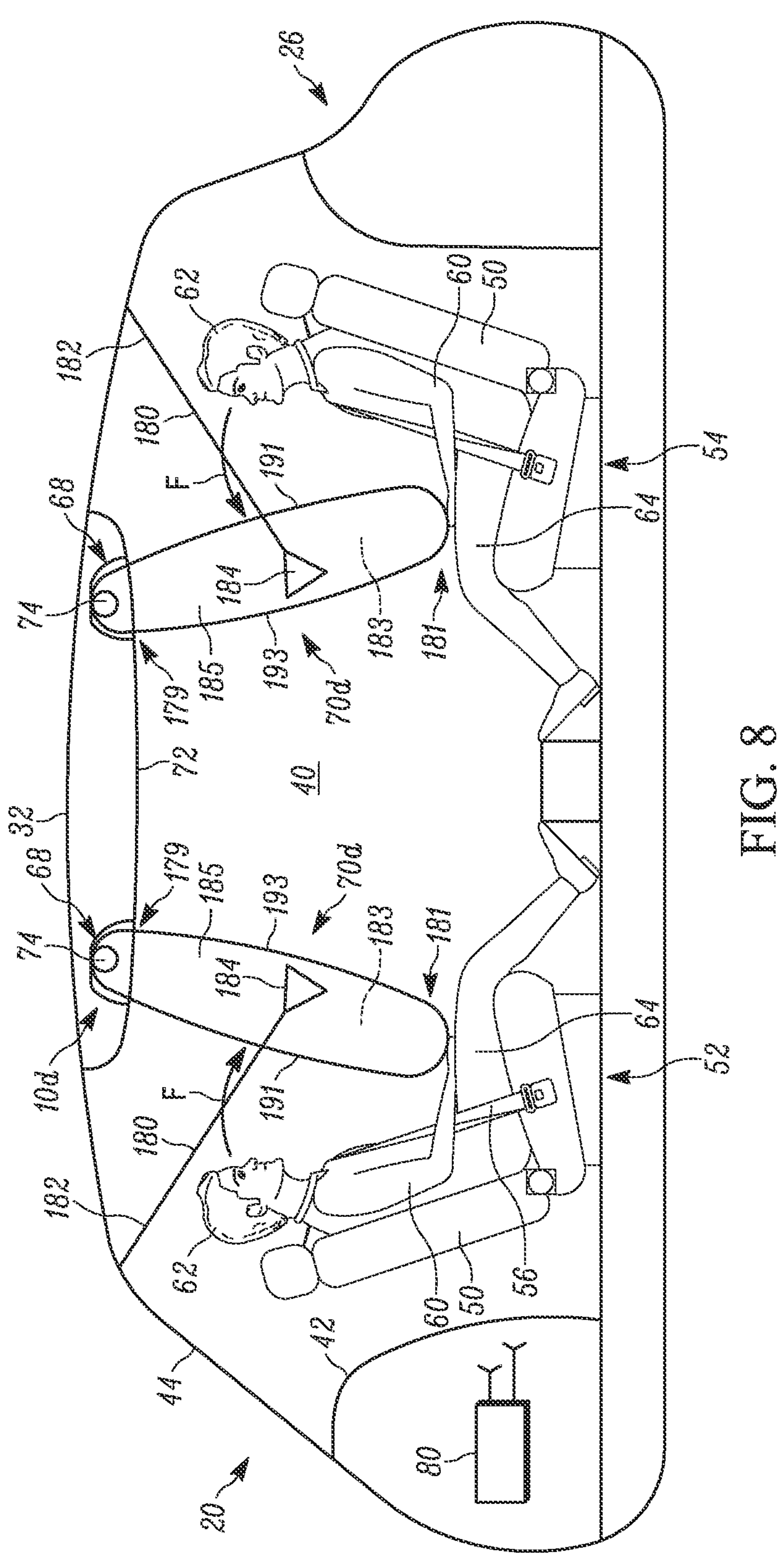
FIG. 8 is a schematic illustration of the airbag of FIG. 7 in a deployed condition.

FIGS. 7-8 illustrate another example configuration of the occupant restraint system 10*d*. In this configuration, the airbag module 68 includes an airbag 70*d* and tethers 180 and the seating arrangement is unconventional. In particular, the vehicle 20 in FIGS. 7-8 is illustrated as having two rows of seats 50 that face each other, with the front row 52 being rearward-facing and the rear row 54 being forward-facing. More or fewer rows of seats facing in either direction are also contemplated.

For the unconventional, forward-rearward seating arrangement shown, in the event of a frontal crash, the occupants 60 of the forward-facing rear row 54 are restrained by their respective seatbelts 56. Occupants 60 of the rear-facing front row 52, while buckled, are supported in a frontal crash by the seatbacks of the vehicle seats 50. Because of this, the seats 50 must be constructed to support the occupants 60 in the event of a crash. For the forward-facing occupants 60 in the rear row 54, the seatbelts 56 offer some degree of restraint. It is desirable, however, for both rows 52, 54 to include additional restraints for head and neck support.

Since the front row 52 need not face forward and need not be in close proximity to the instrument panel 42 or the area where an instrument panel would normally reside, there can be a large volume of space between the front row 52 and the forward cabin structure presented facing the front row. Because of this, it may not be efficient to deploy airbags from this location due to the large volume that the airbags would need to occupy. This would present problems in sizing the airbag(s) and inflator(s) to occupy that large volume, and could also present problems in deploying the airbag(s) into that large volume in the necessary short time required to protect the occupants in a crash scenario.

With this in mind, the airbag 70*d* is positioned in front of the associated seat 50 in each row 52, 54 in the direction the occupants 60 in those seats would face (i.e., rearward of the front row 52 and forward of the rear row 54). The airbags 70*d* extend in the left-to-right direction of the vehicle 20 and generally parallel to the width of the seats 50. Alternatively, a single airbag 70*d* can span the entire width of the cabin 40 to protect all the occupants 60 in an entire row 52 or 54 (not shown). Although the airbags within each example construction described herein are identical for each row provided in the vehicle 20, the construction and operation of only the airbag associated with a seat 50 in the rear row 54 is discussed for brevity.

The airbag 70*d*, when deployed, has a generally elongated, rectangular configuration and extends from an upper end 179 to a lower end 181 to define an inflatable volume 183. The upper end 181 is connected to the airbag module 68 and receives inflation fluid from the inflator 74. The lower end 181 is positioned closer to the occupant 60. A middle portion 185 is provided between the upper and lower ends 179, 181. A front-facing receiving surface or portion 191 faces toward the occupant 60. An opposing rear-facing surface or portion 193 faces away from the occupant 60.

The airbag 70*d* is a curtain airbag having a thickness measured in the direction of vehicle 20 travel that is small in comparison to conventional frontal airbags. The airbag 70*d* can have constructions similar to side impact curtain airbags that deploy along a side structure of the vehicle in the event of a side impact and/or vehicle rollover. The curtain airbag 70*d* spans laterally across the width of the vehicle 20 and thereby helps protect all the occupants 60 in the rear row 54 of seats 50.

Roof tethers 180 support the airbag 70*d* against movement in response to occupant 60 penetration. More specifically, the roof tethers 180 replace the reaction surface typically required for frontal passenger airbags. To this end, a pair of roof tethers 180 can be provided for the airbag 70*d* on the inboard and outboard sides thereof on opposite sides of the occupants 60. Each roof tether 180 extends from a first end 182 connected to the roof 32 and a second end 184 connected to the lower end 181 of the airbag 70*d*. The first ends 182 of the tethers 180 connect to the vehicle 20 behind the airbag 70*d*, the occupants 60, and the seats 50 (i.e., forward of the front row 52 and rearward of the rear row 54). The second end 184 can constitute or include a stress reducer for spreading the connection between the tethers 180 and the airbags 70*d* over a large surface of the airbag fabric so as to prevent tearing.

The tethers 180 can also help maintain the airbag 70*d* at a desired position or altitude in the vehicle 20. For instance, the tethers 180 can position the airbag 70*d* to be angled slightly toward the vehicle seats 50 and occupants 60 (forward in the vehicle 20 for the front row 52 and rearward in the vehicle for the rear row 54).

Advantageously, as shown in FIG. 8, the positions of the first end 182/roof 32 connections are located such that the tethers 180 extend in a direction or along a path that approximates or coincides with the path F along which the occupants 60 travel into contact with the receiving portion 191 of the airbag 70*d*. In this manner, the tension the tethers 180 apply to the airbag 70*d* can be opposite the impact forces applied to the airbag by the penetrating occupants 60. As a result, the roof 32, through the tethers 180, acts as the reaction surface for the airbag 70*d*. The example airbag 70*d* of FIGS. 7-8 therefore requires no interaction with forward structure of the vehicle, such as an instrument panel, steering wheel, or seat, to provide a reaction surface for the airbag.

Figure 9A:
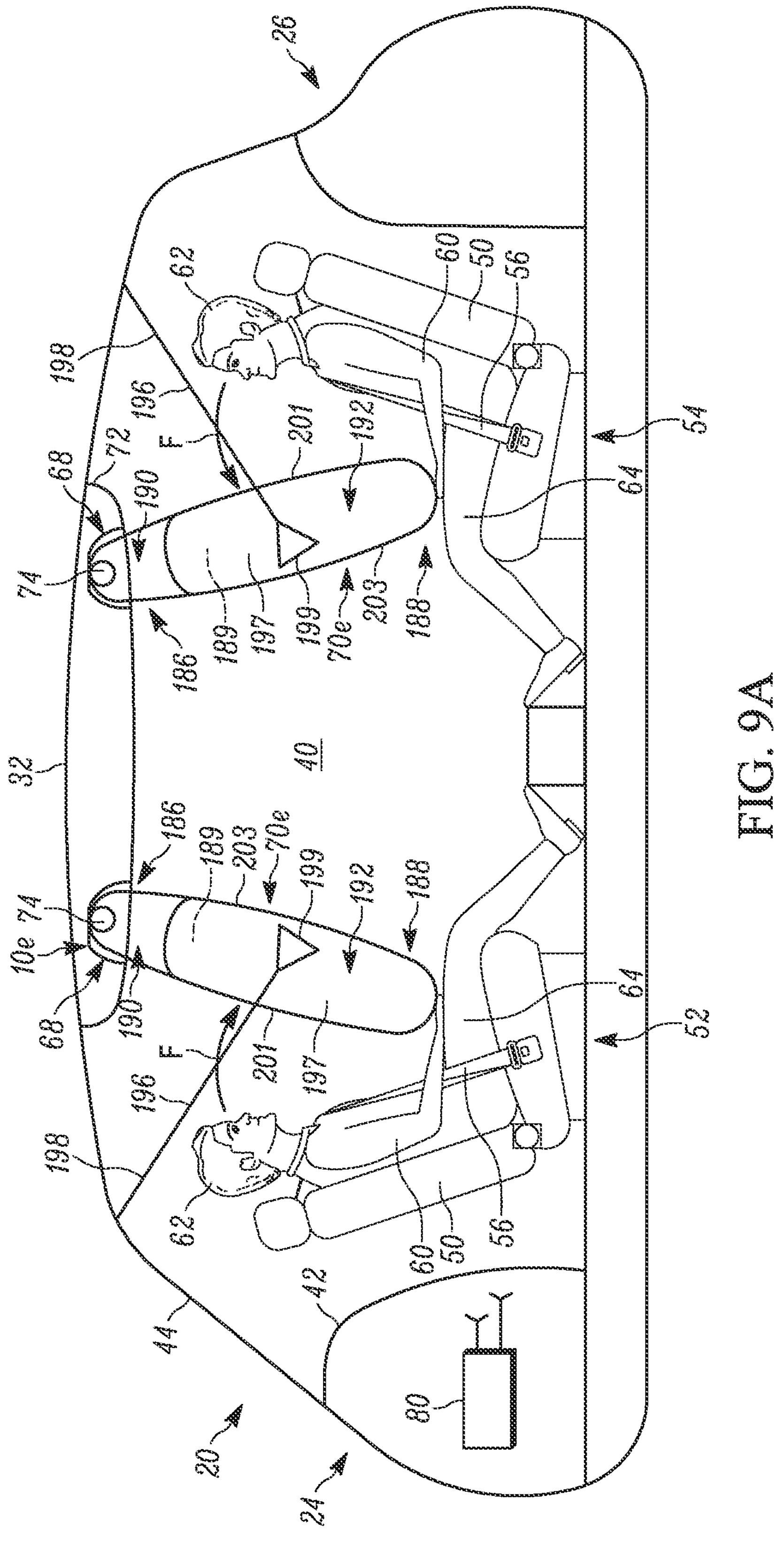
FIG. 9A is a schematic illustration of another example airbag in a deployed condition.
Figure 9B:
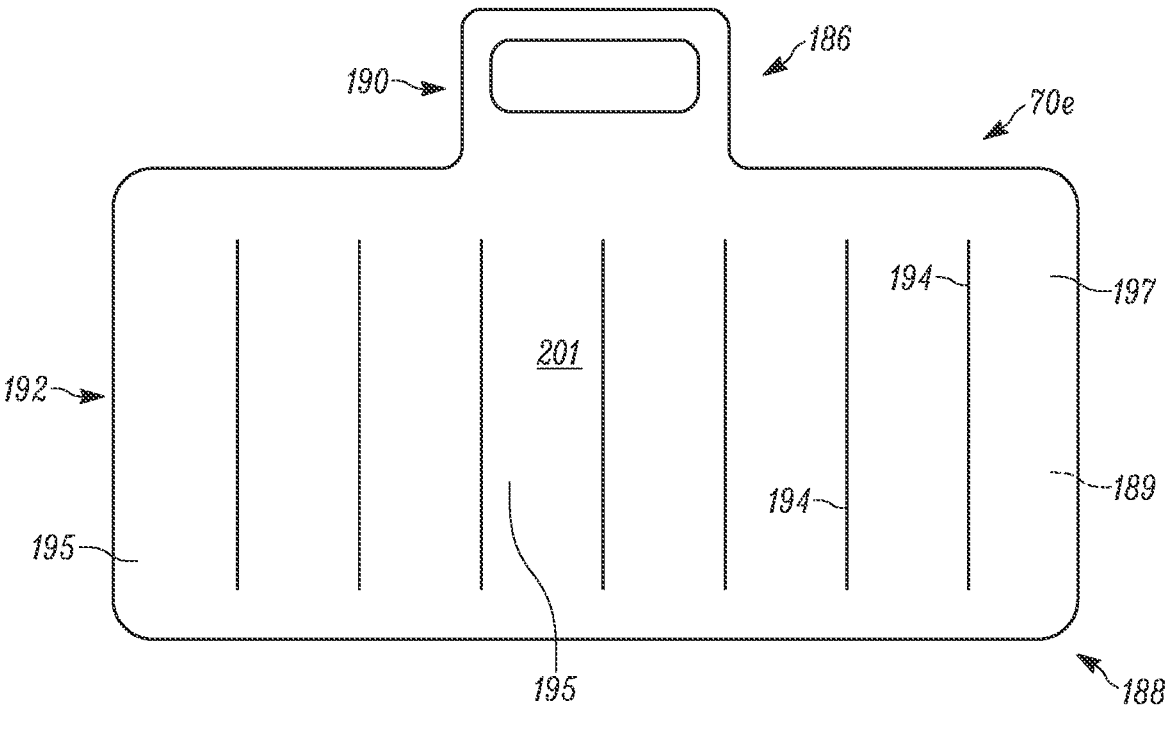
FIG. 9B is a front view of the airbag of FIG. 9A.

FIGS. 9A-9B illustrate another example configuration of the occupant restraint system 10*e*. In this configuration, the air bag module 68 includes an airbag 70*e* and tethers 196. The airbag 70*e* is a curtain airbag having a thickness measured in the direction of vehicle 20 travel that is small in comparison to conventional frontal airbags. The airbag 70*e* can have constructions similar to side impact curtain airbags that deploy along a side structure of the vehicle in the event of a side impact and/or vehicle rollover. The curtain airbag 70*e* spans laterally across the width of the vehicle 20 and thereby helps protect all the occupants 60 in the rear row 54 of seats 50.

The airbag 70*e*, when deployed, has a generally elongated, rectangular configuration. The airbag 70*e* extends from an upper end 186 to a lower end 188 and defines an inflatable volume 189. The upper end 186 is connected to the air bag module 68 and includes a narrow top portion 190 (FIG. 9B) for receiving the inflator 74. A middle portion 197 is provided between the upper and lower ends 186, 188. A front-facing receiving surface or portion 201 faces toward the occupant 60. An opposing rear-facing surface or portion 203 faces away from the occupant 60.

As shown in FIG. 9B, a widened protection portion 192 extends downward from the top portion 190. The protection portion 192 is configured to receive and help protect the occupants 60. The lower end 188 is positioned closer to the occupant 60. Because of this construction, the space or footprint in the vehicle 20 required for installation of the air bag module 68 can be reduced.

Referring to FIG. 9B, the airbag 70*e* can include internal tethers 194 for helping shape or otherwise control the inflated configuration. More specifically, the tethers 194 can be used to control the thicknesses of the curtain airbags 70*e* in the forward-rearward direction and/or to produce parallel, vertically oriented inflatable chambers 195. As shown, the chambers 195 extend from the upper end 186 to the lower end 188. Tethers such as these, and the chambers resulting therefrom, can be implemented in any of the example airbag configurations illustrated and/or described herein, making it thicker in some areas, such as those presented in front of the occupants 60, and thinner in other areas, such as areas between the occupants.

Roof tethers 196 (FIG. 9A) support the airbag 70*e* against movement in response to occupant 60 penetration. More specifically, the roof tethers 196 replace the reaction surface typically required for frontal passenger airbags. To this end, a pair of roof tethers 196 can be provided for the airbag 70*e* on the inboard and outboard sides thereof on opposite sides of the occupants 60. Each roof tether 196 extends from a first end 198 connected to the roof 32 and a second end 199 connected to the lower end 188 of the airbag 70*e*. The first ends 198 of the roof tethers 196 connect to the vehicle 20 behind the airbag 70*e*, the occupants 60, and the seats 50. The second end 199 can constitute or include a stress reducer for spreading the connection between the tethers 196 and the airbags 70*e* over a large surface of the airbag fabric so as to prevent tearing.

The roof tethers 196 can also help maintain the airbag 70*e* at a desired position or altitude in the vehicle 20. For instance, the roof tethers 196 can position the airbag 70*e* to be angled slightly toward the vehicle seats 50 and occupants 60 (forward in the vehicle 20 for the front row 52 and rearward in the vehicle for the rear row 54). Advantageously, as shown in FIG. 9A, the positions of the first end 198/roof 32 connections are located such that the roof tethers 196 extend in a direction or along a path that approximates or coincides with the path F along which the occupants 60 travel into contact with the receiving portion 201 of the airbag 70*e*.

In this manner, the tension the roof tethers 196 apply to the airbag 70*e* can be opposite the impact forces applied to the airbag by the penetrating occupants 60. As a result, the roof 32, through tethers 196, acts as the reaction surface for the airbag 70*e*. The example airbag 70*e* of FIGS. 9A-9B therefore requires no interaction with forward structure of the vehicle, such as an instrument panel, steering wheel, or seat, to provide a reaction surface for the airbag.

Figure 10:
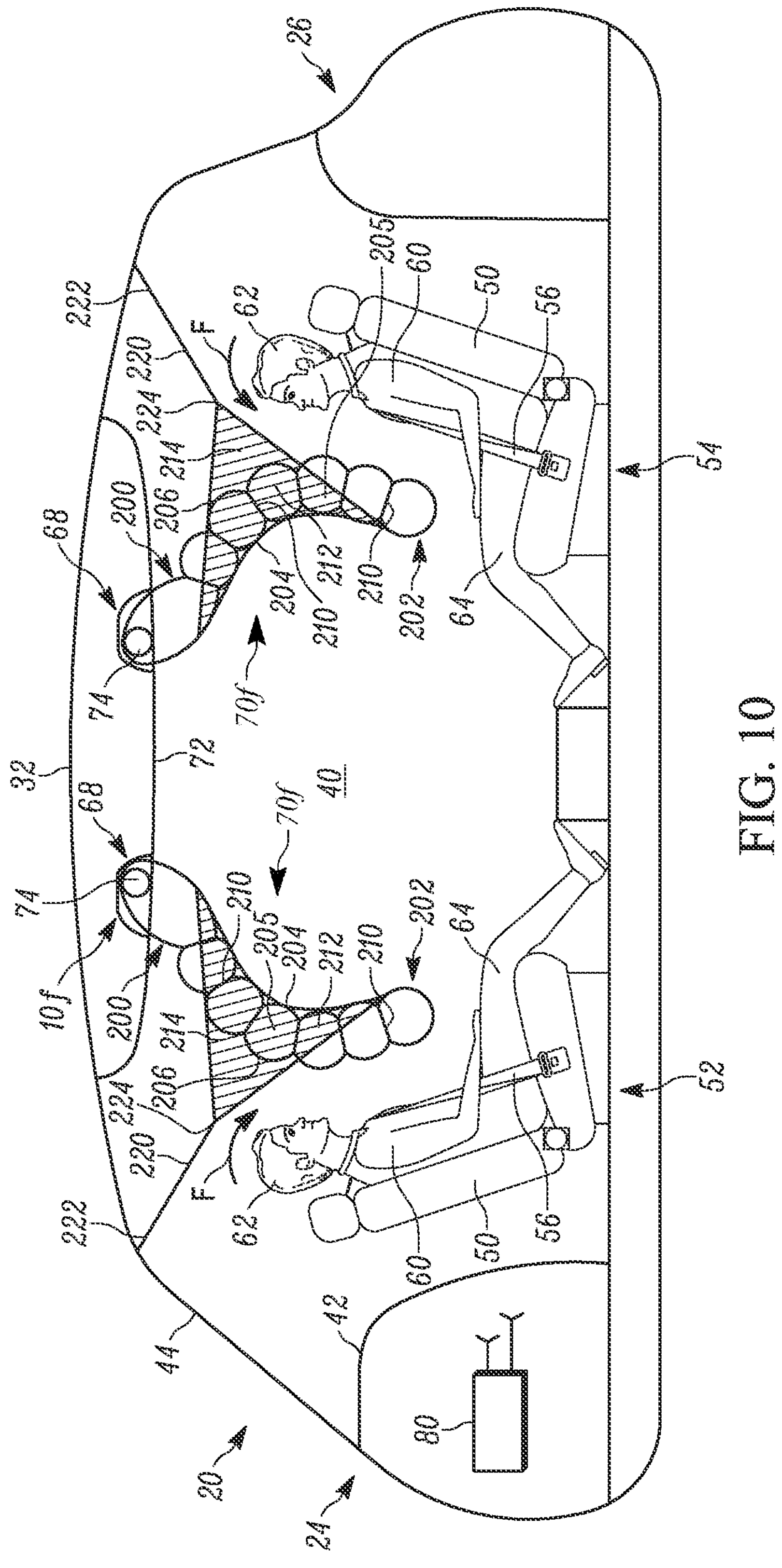
FIG. 10 is a schematic illustration of another example airbag in a deployed condition.

FIG. 10 illustrates another example configuration of the occupant restraint system 10*f*. In FIG. 10, the airbag module 68 includes an airbag 70*f*, shaping sheets 214, and roof tethers 220. The airbag 70*f*, when deployed extends from an upper end 200 to a lower end 202 and defines an inflatable volume. A middle portion 205 is provided between the upper and lower ends 200, 202.

The airbag 70*f* includes a front-facing receiving surface or portion 206 that faces toward the occupant 60. An opposing rear-facing surface or portion 204 faces away from the occupant 60. The portions 204, 206 are interconnected by connections 210 (e.g., tethers, stitching, fabric welds, adhesives, etc.) to form a plurality of inflatable cells 212. The cells 212 can extend laterally across the width of the airbag 70*f*. The airbag 70*f* can span laterally across the entire width of the cabin 40 and thereby help protect occupants 60 of an entire row of seating in the vehicle. Alternatively, the airbag 70*f* can span laterally across the width of a single passenger seating position and thereby help protect an occupant 60 of a single seat (not shown).

The shaping sheets 214 are secured to opposite sides (e.g., the inboard and outboard sides) of the airbag 70*f* to help control the shape thereof. In one example, the shaping sheets 214 shape the airbag 70*f* to have a curved configuration as viewed from the side (e.g., curved convexly toward the occupants 60).

The roof tethers 220 support the airbag 70*f* against movement in response to occupant 60 penetration. More specifically, the roof tethers 220 replace the reaction surface typically required for frontal passenger airbags. To this end, a pair of roof tethers 220 can be provided for the airbag 70*f* on the inboard and outboard sides thereof on opposite sides of the occupants 60. Each roof tether 220 extends from a first end 222 connected to the roof 32 and a second end 224 connected to a shaping sheet 214. The first ends 222 of the roof tethers 220 connect to the vehicle 20 behind the airbag 70*f*, the occupants 60, and the seats 50. The second end 224 is connected to the shaping sheet 214 in a manner that helps maintain the convex shape of the airbag 70*f* during deployment.

The roof tethers 220 can also help maintain the airbag 70*f* at a desired position or altitude in the vehicle 20. As shown, the roof tethers 220 can position the airbag 70*f* angled slightly toward the vehicle seats 50 and occupants 60 while, at the same time, the shaping sheets 214 maintain the convex curvature of the airbag. Advantageously, as shown in FIG. 10, the positions of the first end 222/roof 32 connections are located such that the roof tethers 220 extend in a direction or along a path that approximates or coincides with the path F along which the occupants 60 travel into contact with the receiving portion 206 of the airbag 70*f*.

In this manner, the tension the roof tethers 220 apply to the airbag 70*f* can be opposite the impact forces applied to the airbag by the penetrating occupants 60. As a result, the roof 32, through tethers 220, acts as the reaction surface for the airbag 70*f*. The example airbag 70*f* of FIG. 10 therefore requires no interaction with forward structure of the vehicle, such as an instrument panel, steering wheel, or seat, to provide a reaction surface for the airbag.

Figure 11:
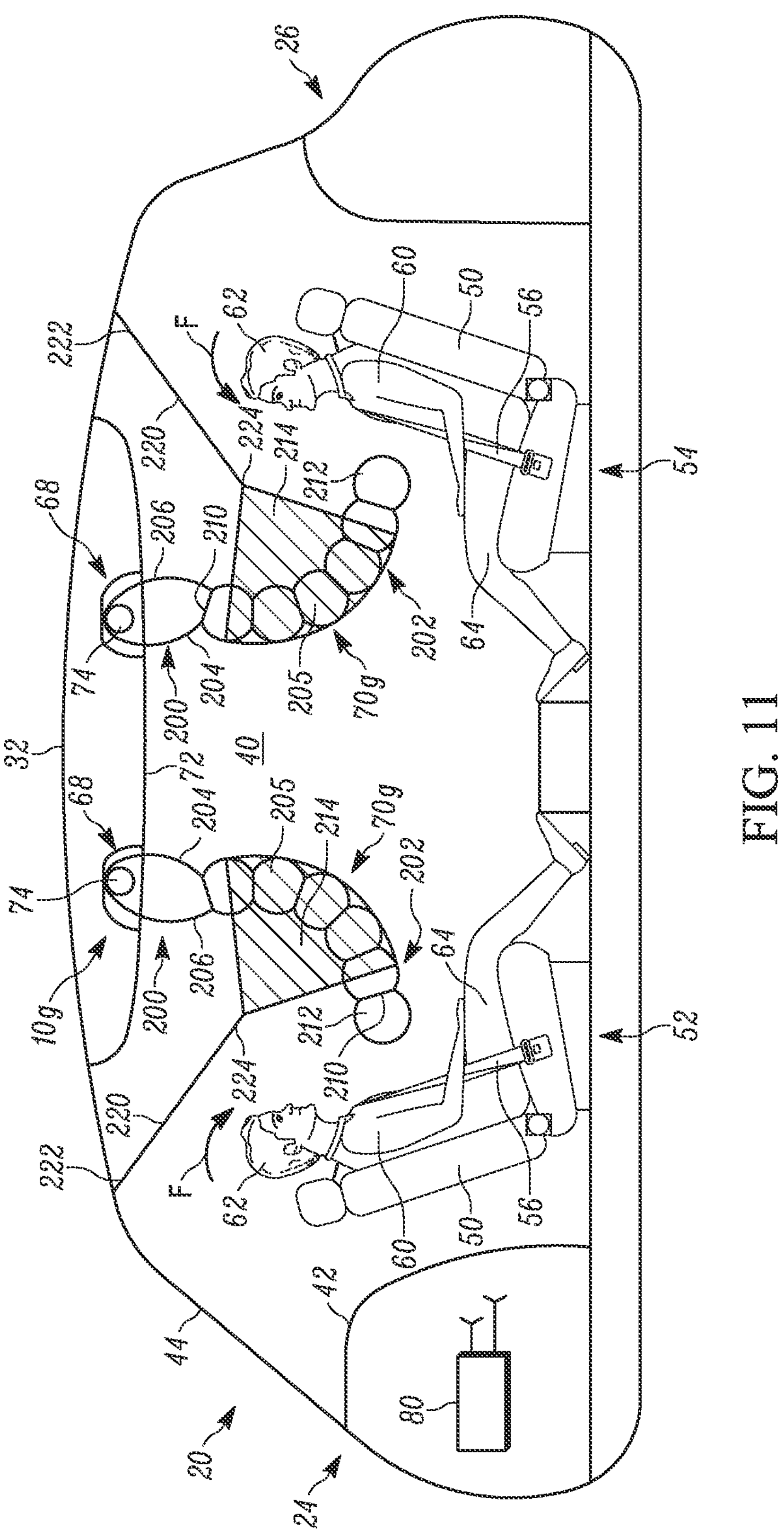
FIG. 11 is a schematic illustration of another example airbag in a deployed condition.

FIG. 11 illustrates another example configuration of the occupant restraint system 10*g*. The occupant restraint system 10*g* in FIG. 11 is identical to the vehicle safety system in FIG. 10 except that the shaping sheets 214 and tethers 220 cooperate to shape the airbag 70*g* so that the panel 202 is curved concavely away from the occupants 60.

Figure 12:
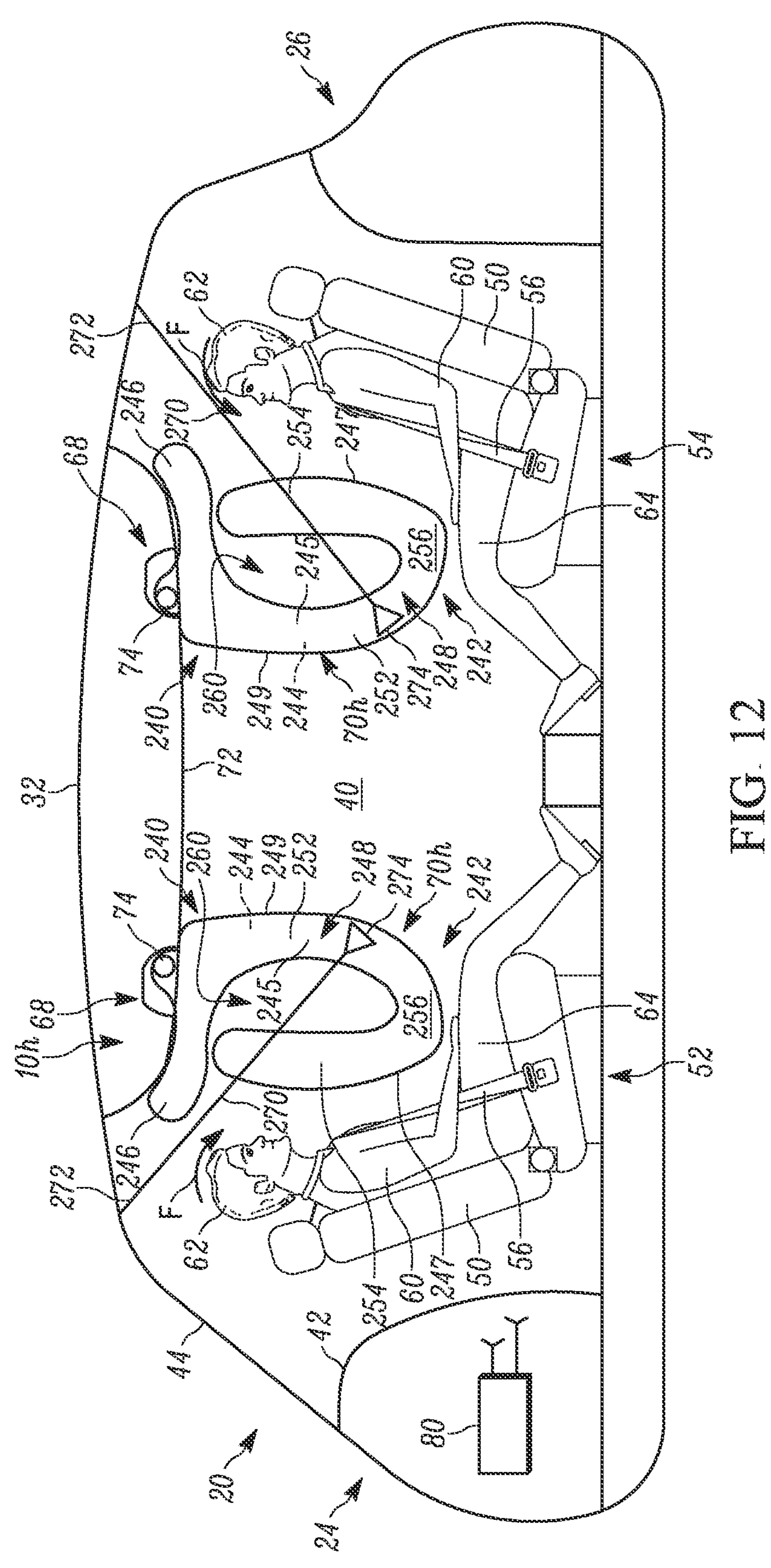
FIG. 12 is a schematic illustration of another example airbag in a deployed condition.

FIG. 12 illustrates another example configuration of the occupant restraint system 10*h*. In FIG. 12, the airbag module 68 includes an airbag 70*h* and roof tethers 270. The airbag 70*h*, when deployed, extends from an upper end 240 to a lower end 242 and defines an inflatable volume 244. A middle portion 245 is provided between the upper and lower ends 240, 242. A front-facing receiving surface or portion 247 faces toward the occupant 60. An opposing rear-facing surface or portion 249 faces away from the occupant 60.

The airbag 70*h* includes a first portion 246 extending along the roof 32 and a second portion 248 having a U-shaped configuration and connected to the first portion. The first portion 246 is connected to the airbag module 68 and receives inflation fluid from the inflator 74.

The second portion 248 includes a pair of spaced-apart legs 252, 254 connected by a connecting portion 256. The leg 252 is connected to the first portion 246. The leg 254 is a free end of the second portion 248. The legs 252, 254 terminate adjacent the roof 32. The connecting portion 256 is positioned closer to the occupant 60. The legs 252, 254 are especially resistant to movement toward each other because of the pressurized inflation fluid therein. This pre-loads the legs 252, 254 against movement toward each other.

The U-shaped airbag **70*h* has a smaller inflatable volume 244 than a single chamber construction having the same outer, peripheral footprint while using more airbag fabric to define the inflatable volume. Since the legs 252, 254 of the U-shaped airbag 70*h* have comparatively small thicknesses, they have a high surface area to volume ratio. This renders the legs 252, 254** relatively and comparatively stiff when inflated.

The roof tethers 270 support the airbag **70*h* against movement in response to occupant 60 penetration. More specifically, the roof tethers 270 replace the reaction surface typically required for frontal passenger airbags. To this end, a pair of roof tethers 270 can be provided for the airbag 70*h* on the inboard and outboard sides thereof on opposite sides of the occupants 60. Each roof tether 270 extends from a first end 272 connected to the roof 32 and a second end 274 connected to the leg 252 at the lower end 242 of the airbag 70*h*. The first ends 272 of the roof tethers 220 connect to the vehicle 20 behind the airbag 70*h*, the occupants 60, and the seats 50**.

The construction of the airbag **70*h* is such that, during inflation, the legs 252, 254, tend to move away from each other. Since the leg 254 is free, occupant 60 penetration into the leg 254 causes the leg 254 to move in the path F towards the leg 252. Advantageously, as shown in FIG. 12, the positions of the first end 272/roof 32 connections are located such that the roof tethers 270 extend in a direction or along a path that approximates or coincides with the path F along which the occupants 60 travel into contact with the receiving portion 247 of the airbag 70*h***.

In this manner, the tension the roof tethers 270 apply to the leg 252 can be opposite the impact forces applied to the airbag **70*h* by the penetrating occupants 60. More specifically, the roof 32, through the tethers 270, constrains movement of the leg 252 to thereby enable the leg 252 to restrict movement of the leg 254 along the path F. The example airbag 70*h* configuration of FIG. 12** therefore requires no interaction with forward structure of the vehicle, such as an instrument panel, steering wheel, or seat, to provide a reaction surface for the airbag.

From the above, it will be appreciated that the example configurations of FIGS. 1-12 illustrate that the airbag is configured to utilize the vehicle roof as a reaction surface in both the conventional and unconventional seating arrangements. By "reaction surface," it is meant that it is the vehicle roof that supports the airbag against movement in response to an impacting occupant. In other words, the airbag attempts to move in a first direction and the roof applies a reaction force to the airbag in a second, opposite (or substantially opposite) direction to limit/prevent movement of the airbag in the first direction. This allows the airbag to absorb impact forces of the occupant and provide the desired ride-down effect.

Advantageously, the example configurations can require only the vehicle roof to provide the reaction surface and can provide effective occupant protection without requiring any support from structure presented forward of the occupants. The vehicle roof can support the airbag module and the airbag entirely. In certain example configurations, some additional structure, such as the windshield (see FIGS. 4 and 5) or the vehicle side structure (see FIG. 6) can also help provide a reaction surface. In all of these example configurations, however, vehicle structure toward which the non-occupant facing surface of the airbag is presented is not used as a reaction surface.

It will also be appreciated that features shown and illustrated in any one example can likewise be added to/interchanged with features in any other example. Additionally, it will be appreciated that any of the tethers 120, 168, 174, 180, 196, 220, 270 can be connected to airbag module instead of the roof 72, side structure of the vehicle 20, etc. Moreover, any of the vehicle safety systems shown and described herein can be provided without external tethers connecting the airbag to the vehicle (e.g., any of the tethers 120, 168, 174, 180, 196, 220, 270 can be omitted). In such configurations, the lower end of the airbag is specifically configured to engage the lap/lower torso of the occupant(s) intended for protection. Consequently, in these configurations, the occupant's lap/lower torso applies the reaction force to the airbag and thereby fixes the lower end of the deployed airbag in place to prevent movement of the lower end of the airbag during occupant penetration. The occupant can therefore also act as a reaction surface for the airbag.

With this in mind, it will be appreciated that in every example airbag shown and described herein, neither the rear-facing surface/portion facing away from the occupant nor the middle portion of the airbag relies on or engages vehicle structure (e.g., the roof, instrument panel, windshield or a seatback of a vehicle seat) to restrict movement of the airbag away from the penetrating occupant. This helps to ensure that the airbags described herein can operate in the absence of vehicle structure that is omitted in autonomous vehicles, such as the seatback in front of the occupant, the instrument panel, etc.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

We claim:

1. A restraint system for helping to protect an occupant of a vehicle having a roof and a cabin with a seat for the occupant, comprising:

an airbag mounted to the vehicle roof, the airbag having a stored condition and being inflatable to a deployed condition, the airbag when deployed having a front-facing occupant receiving portion and an opposite rear-facing portion facing away from the occupant;

an inflator configured to direct inflation fluid into the airbag to inflate and pressurize the airbag;

wherein the airbag has a generally U-shaped configuration with a first leg comprising the occupant receiving portion and a second leg comprising the rear-facing portion, the first leg having a terminal end portion with a connection to the vehicle roof, wherein the airbag is configured to pivot about the connection to the vehicle roof in response to the occupant receiving portion being acted upon by an impacting occupant;

wherein a terminal end portion of the second leg is free from connections to the vehicle and configured to move into engagement with the vehicle roof in response to the airbag pivoting about the connection to cause the vehicle roof to act as a reaction surface for resisting pivoting movement of the airbag about the connection in response to the impacting occupant so that the airbag cushions the impacting occupant without relying on the rear-facing portion of the airbag engaging vehicle structure other than the roof as a reaction surface for supporting the airbag;

wherein the restraint system further comprises at least one tether that connects the end portion of the first leg to the end portion of the second leg, wherein the first and second legs are configured to move away from each other in response to pressurization and the at least one tether is configured to limit the first and second legs from moving away from each other in response to pressurization so that pressurization of the first and second legs tensions the at least one tether, which pre-loads the first and second legs against movement toward each other;

wherein the inflator is configured to deliver a volume of inflation fluid to the airbag sufficient to pressurize the first and second legs such that the pre-load resists movement of the first leg toward the second leg to a degree sufficient to absorb impact forces and provide a ride-down effect to the occupant due to the vehicle roof receiving the end of the second leg and acting as a reaction surface that resists further pivotal movement of the airbag about the connection of the first leg to the vehicle roof.

2. The restraint system recited in claim 1, wherein the at least one tether is configured to enforce a curved configuration of the airbag when deployed.

3. The restraint system recited in claim 2, wherein the curved configuration enforced by the at least one tether comprises a curved configuration of a front-facing surface of the airbag.

4. The restraint system recited in claim 2, wherein the at least one tether is configured to restrict movement of the end portion of the second leg away from the roof.

5. The restraint system recited in claim 1, wherein the restraint system is configured to use only the roof as the reaction surface.

6. The restraint system recited in claim 1, further comprising:

a sensor configured to sense the occurrence of an event for which deployment of the airbag is desired and to produce a signal indicative thereof; and a controller operatively connected to the sensor and to the inflator, the controller being configured, in response to receiving the signal from the sensor, to actuate the inflator to inflate the airbag to the deployed condition.

7. A roof-mounted airbag for helping to protect an occupant of a vehicle having a roof and a cabin with a seat for the occupant, comprising:

an inflatable U-shaped chamber having a first leg with an upper end configured to be connected to the vehicle roof, a second leg with an upper end free from connections to the vehicle and configured to engage the vehicle roof, and a third leg that extends between and connects lower ends of the first and second legs, wherein the first leg is configured to receive the occupant; and a tether that connects the first leg to the second leg;

wherein the first leg is configured to allow the airbag to pivot with respect to the roof about a connection of the upper end of the first leg to the roof in response to the first leg being acted upon by an impacting occupant;

wherein the upper end of the second leg is configured to move into engagement with the vehicle roof to cause the vehicle roof to act as a reaction surface for resisting pivoting movement of the airbag about the connection in response to the impacting occupant;

wherein the first and second legs are configured to move away from each other in response to pressurization of the U-shaped chamber;

wherein the tether is configured to limit the first and second legs from moving away from each other in response to pressurization so that pressurization of the U-shaped chamber tensions the tether, which allows the U-shaped chamber to be pressurized in order to pre-load the first and second legs against movement toward each other.

* * * * *